Patented Dec. 4, 1928.

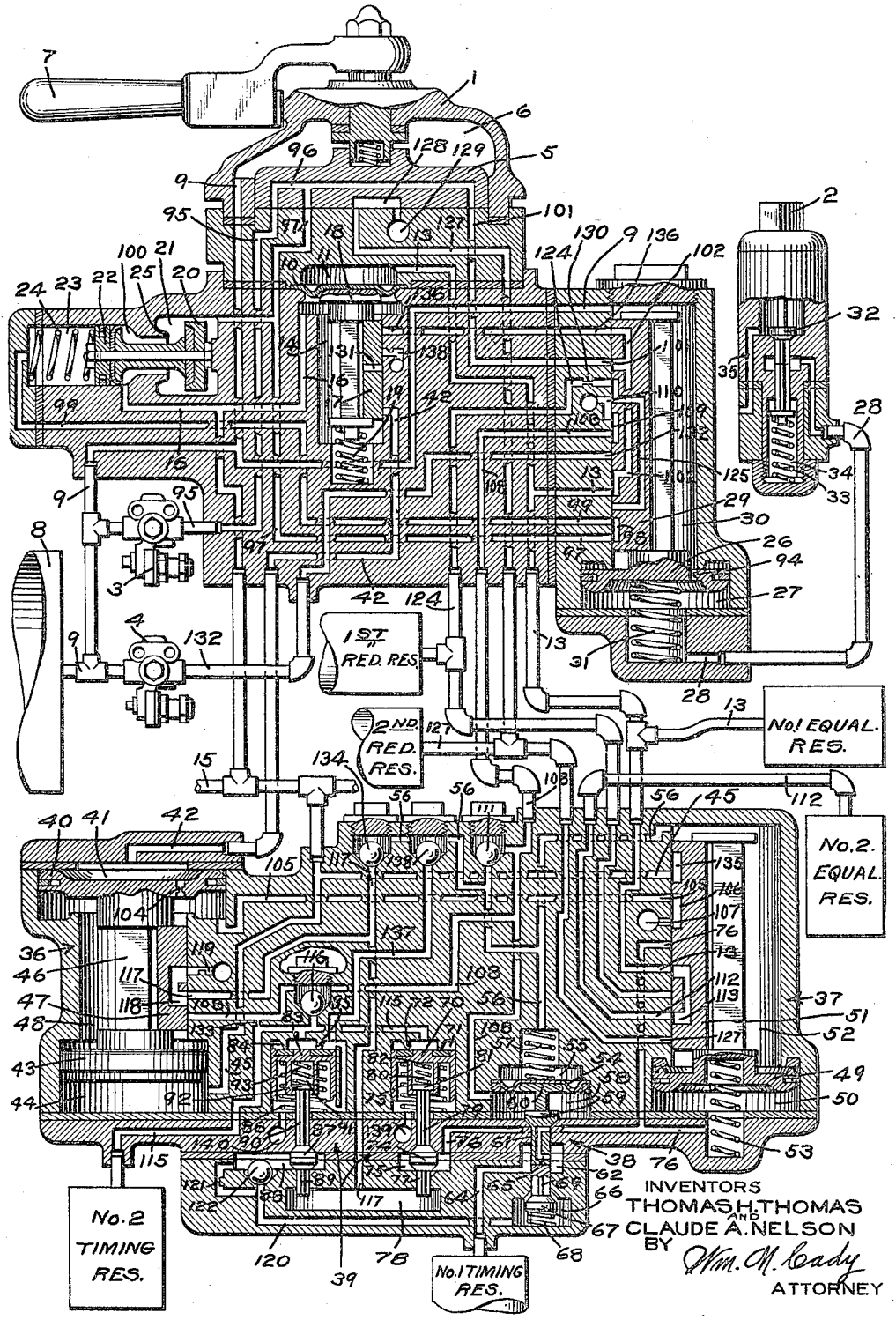

1,693,627

UNITED STATES PATENT OFFICE.

THOMAS H. THOMAS, OF EDGEWOOD, AND CLAUDE A. NELSON, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed November 17, 1927. Serial No. 233,791.

This invention relates to fluid pressure brakes and more particularly to the type of locomotive brake equipment having means for automatically effecting successive reductions in brake pipe pressure, when an application of the brakes is initiated.

In order to obtain smooth and safe braking of a train, the reduction in brake pipe pressure must be started at such a gradual rate that the brakes will not be applied with sufficient force to cause the slack to be gathered harshly and thus produce severe shocks, which, in some cases, may be sufficient to wreck the train. After the train slack is thus gently gathered, the rate of reducing the brake pipe pressure may be increased to apply the brakes with the desired force, without harm.

One object of our invention is to provide improved means for automatically effecting successive reductions in brake pipe pressure, by which the first reduction is effected at a predetermined slow rate and after the first reduction is completed, the second reduction is made at a faster rate.

In the usual locomotive brake equipment, the equalizing valve piston, which operates the brake pipe discharge valve, is subject on one side to brake pipe pressure and on the opposite side to equalizing reservoir pressure, so that in effecting a brake application on a train, the discharge valve is opened to vent fluid from the brake pipe by operation of the equalizing piston when the pressure in the equalizing reservoir is reduced below that in the brake pipe.

Under some conditions, such as brake pipe leakage and dependent upon the length of the train, the brake pipe pressure acting on the equalizing piston may reduce at a faster rate than the equalizing reservoir pressure is reduced. It is desirable that the brake pipe pressure should not be reduced at a greater rate than that effected by operation of the equalizing discharge valve mechanism and therefore one object of our invention is to provide means for preventing a reduction in brake pipe pressure at a greater rate than would be effected by operation of the equalizing discharge valve mechanism.

Another object of our invention is to provide improved means for ensuring that the second reduction will be started within a predetermined time limit from the start of the first reduction.

Another object of our invention is to provide means for ensuring that the time between the start of the first and the start of the second reduction will vary according to the length of the train.

Other objects and advantages will appear in the following more detailed description of our invention.

In the accompanying drawing, the single figure is a diagrammatic view of a fluid pressure brake equipment embodying our invention.

As shown in the drawing, the equipment comprises an automatic brake valve device 1, a magnet valve device 2, two feed valve devices 3 and 4, and a split or two stage reduction valve device.

The automatic brake valve device 1 comprises a rotary valve 5 contained in a valve chamber 6 and adapted to be operated by a handle 7, the valve chamber 6 being connected to a main reservoir 8 through passage and pipe 9. In the casing of the brake valve device is disposed an equalizing valve mechanism, which comprises a diaphragm 10 having at one side a chamber 11 connected to a No. 1 equalizing reservoir through passage and pipe 13 and having at the opposite side a valve chamber 14 connected to brake pipe 15 through a passage 16. Contained in the valve chamber 14 is a slide valve 17 mounted between two flanges on the stem of a diaphragm head 18, which head is held in engagement with the diaphragm 10 by the pressure of a spring 19. The slide valve 17 is adapted to be moved in one direction by the deflection of diaphragm 10, and in the opposite direction by the pressure of the spring 19.

Associated with the brake valve device is a cut-off valve mechanism comprising a cut-off valve 20 contained in a chamber 21 and adapted to be operated by a cut-off valve piston 22 contained in a chamber 23. A spring 24 opposes outward movement of the piston 22 and consequent seating of the cut-off valve 20 against a seat ring 25.

Preferably associated with the brake valve device is an application valve portion comprising a piston 26 contained in a chamber 27, which chamber is connected to the magnet valve device 2 through passage and pipe 28.

A slide valve 29, contained in a valve chamber 30 is adapted to be operated by the piston 26, which is opposed in outward movement by the pressure of a spring 31.

The magnet valve device 2 comprises a magnet adapted to control the operation of a valve 32 and a spring 33 urging said valve away from its seat. The magnet valve device is controlled by train control apparatus (not shown) in such a manner that if the track conditions are unfavorable, the magnet of the magnet valve device is deenergized and spring 33 unseats the valve 32, which opens communication between the application piston chamber 27 and the atmosphere through passage and pipe 28 and passage 35, but if the track conditions are favorable, the magnet is energized and the valve 32 is held seated, so that the connection from the application piston chamber 27 to the exhaust port 35 is cut off.

The split or two stage reduction valve device comprises a control portion 36, a hold-back portion 37, a charging valve portion 38, and a delay valve portion 39.

The control portion 36 of the split reduction device comprises a piston 40 contained in a chamber 41, which is connected to a pipe and passage 42 leading to the seat of the equalizing slide valve 17 of the brake valve device and a piston 43 contained in a chamber 44, which is connected to the brake pipe 15 through passage 45. The pistons 40 and 43 are connected together by a stem 46 and are adapted to operate a slide valve 47 contained in a valve chamber 48, the pistons having different areas.

The hold-back portion 37 comprises a piston 49 contained in a chamber 50 and a slide valve 51 contained in a valve chamber 52 and adapted to be operated by said piston, which piston is opposed in outward movement by the pressure of a spring 53.

The charging valve portion 38 comprises a diaphragm 54 forming, at one side, a chamber 55 connected to the hold-back valve chamber 52 through passage 56 and containing a spring 57 which opposes upward movement of said diaphragm. The diaphragm 54 forms at the opposite side a chamber 58 containing a valve 59 adapted to be operated by a stem secured to a diaphragm head 60. The valve 59 has a stem 61 which extends through an opening in a wall of the casing and into a chamber 62, which chamber is connected to a No. 1 timing reservoir through passage and pipe 64. The valve stem 61 is provided with a port 65, which, when the valve is unseated, connects chambers 58 and 62 and when the valve is seated such connection is cut off. The casing of the charging valve portion has a chamber 66 containing a valve 67, which is subject to the pressure of a spring 68 tending to seat the valve. The valve 67 has a fluted stem 69 extending through an opening in a wall of the casing and engaging the stem 61 of valve 59. The valve stems 61 and 69 are of such length, that when either one of the valves 59 or 67 is seated, the other valve is unseated.

The delay valve portion 39 comprises a maximum delay valve piston 70 contained in a chamber 71 and subject to the pressure of a spring 73, tending to hold the piston in engagement with a seat ring 72. A double beat valve 74 is contained in a chamber 75, which is connected to the hold-back piston chamber 50 through a passage 76. The valve 74 has at one side a fluted stem 77 extending through an opening in a wall of the casing and into a chamber 78 and has at the opposite side a fluted stem 79 extending through a wall in the casing and into a chamber 80 formed in the interior of the valve piston 70. Interiorly formed at the lower edge of the wall surrounding chamber 80 is a shoulder adapted to engage a thrust collar 81 secured to the valve stem 79, so as to seat the double beat valve 74 in the position shown in the drawing when the valve piston 70 engages the seat ring 72. Interposed between the collar 81 and valve piston 70 is a spring 82 adapted to seat the double beat valve in the lower position upon downward movement of the valve piston 70.

The delay valve portion also comprises a minimum delay valve piston 83 contained in a chamber 84 and subject to the pressure of a spring 86 tending to hold the piston in engagement with a seat ring 85. A double beat valve 87 is contained in a chamber 88 and has at one side a fluted stem 89 extending through an opening in the casing and into the chamber 78 and has at the opposite side a fluted stem 90 extending through a wall in the casing and into a chamber 91 formed on the interior of the valve piston 83. Interiorly formed at the lower edge of the wall enclosing chamber 91 is a shoulder adapted to engage a thrust collar 92 secured to the valve stem 90, so as to seat the double beat valve 87 in the position shown in the drawing when the valve piston 83 engages the seat ring 85. Interposed between the collar 92 and the valve piston 83 is a spring 93 adapted to seat the double beat valve 87 in the lower position upon downward movement of the valve piston 83.

In operation, in charging the brake system, fluid under pressure is supplied from the main reservoir 8 through pipe and passage 9 to the rotary valve chamber 6 of the automatic brake valve device 1 and to the application valve chamber 30 of the brake application portion, from which valve chamber, fluid flows through a port 94 in the application piston 26 to the piston chamber 27 and from thence to passage and pipe 28 leading to the magnet valve device 2.

With a train operating in territory where the track conditions are favorable, the magnet of the magnet valve device is energized and the valve 32 thus seated, so that the fluid pressure equalizes on the opposite sides of the application piston 26, and the pressure of spring 31 therefore holds the application piston 26 and slide valve 29 to the release position, as shown in the drawing.

Fluid at the usual pressure employed in the brake pipe is supplied by the feed valve device 3 to the seat of the rotary valve 5 through pipe and passage 95. With the brake valve in running position, as shown in the drawing, fluid from passage 95 flows through cavity 96 in the rotary valve 6 and passage 97 to the cut-off valve chamber 21 and also from passage 97 through cavity 98 in the application slide valve 29 and passage 99 to the cut-off valve piston chamber 23. With the brake system uncharged, the spring 24 holds the cut-off valve 20 away from the seat ring 25, so that in charging, the chambers 23 and 100 at the opposite sides of the cut-off valve piston 22 are charged at the same time with substantially the same degree of pressure, thereby permitting spring 24 to maintain the cut-off valve 20 open, which permits fluid at the reduced pressure supplied by the feed valve device 3 to flow from the cut-off valve chamber 21 through chamber 100 and passage 16 to the equalizing valve chamber 14 and brake pipe 15, thereby charging said chamber and brake pipe.

Fluid at feed valve pressure also flows from cavity 96 in the rotary valve 6 to the equalizing diaphragm chamber 11 and the No. 1 equalizing reservoir by way of passage 101, cavity 102 in the application slide valve 29 and passage and pipe 13. The fluid pressures thus become substantially equal on the opposite sides of the equalizing diaphragm 10 and the pressure of spring 19 therefore maintains the equalizing slide valve 17 in the normal position, as shown in the drawing, in which position passage 42, from the control piston chamber 41 of the split reduction device, is lapped.

With the application valve portion of the brake valve device in the release position, the diaphragm chamber 58 of the charging valve portion 38 of the split reduction device, is vented to the atmosphere through passage and pipe 108, cavity 109 in the application slide valve 29 and the atmospheric exhaust passage 110. The diaphragm chamber 55 of the charging valve portion and the hold-back valve chamber 52 are connected to the atmosphere through passage 56, past the ball check valve 111 and through the passage 108. The pressure of spring 57, acting on the charging valve diaphragm 54 is therefore permitted to hold the valve 59 seated and the valve 67 unseated, while the pressure of spring 53 on the hold-back piston 49 holds said piston and the slide valve 51 in the position shown in the drawing, in which position, the No. 2 equalizing reservoir is connected to the No. 1 equalizing reservoir through pipe and passage 112, cavity 113 in the hold-back slide valve 51 and passage and pipe 13, so that the No. 2 equalizing reservoir is charged with fluid at feed valve pressure at the same time as the No. 1 equalizing reservoir is charged.

With the hold-back piston 49 and slide valve 51 in the inner position, as shown in the drawing, the control valve chamber 48 and control piston chamber 41, which is connected to the valve chamber 48 through the restricted port 104 in the control piston 40, are connected to the atmosphere through passage 105, cavity 106 in the hold-back slide valve 51 and the atmospheric exhaust passage 107. Since the control piston chamber 44 is charged with fluid under pressure from the brake pipe 15 through passage 45, such pressure acting on the control piston 43 holds the control pistons 40 and 43 and slide valve 47 in the upper position, as shown in the drawing.

The chambers inside the seat rings 72 and 85 of the maximum and minimum delay valves 70 and 83, respectively, and a No. 2 timing reservoir, which are connected together by passage 115, are vented to the atmosphere past the ball check valve 116 and through the vented passage 108, so that the pressure of springs 73 and 86 normally holds said delay valves in the position shown in the drawing, in which position the double beat valves 74 and 87 are held seated in their upper position. With the double beat valve 74 seated in the upper position, the hold back piston chamber 50 is connected to the atmosphere through passage 76, valve chamber 75, chamber 78, passage 117, cavity 118 in the control slide valve 47 and the choked atmosphere exhaust passage 119, while with the double beat valve 87 seated in the upper position, the No. 1 timing reservoir is connected to the atmosphere through passage 64, valve chamber 62, past the unseated valve 67, through valve chamber 66, passage 120, restricted passage 121, and at the same time past a ball check valve 122, and from thence through valve chamber 88, past the valve 87 and then by way of the chamber 78 which is now vented to the atmosphere as above described.

With the application valve portion of the brake valve device in release position, as shown in the drawing, a first reduction reservoir is connected to the atmosphere through pipe and passage 124, cavity 125 in the application slide valve 29 and the atmospheric passage 110, and with the brake valve device in running position, as shown in the drawing, a second reduction reservoir is connected to the atmosphere through pipe and passage 127, cavity 128 in the brake valve rotary valve 5 and the atmospheric passage 129.

If the track conditions become unfavorable, the magnet of the magnet valve device 2 is deenergized and the spring 33 unseats the valve 32, which permits the fluid under pressure to be vented from the application piston chamber 27 to the atmosphere through passage and pipe 28 and the passage 35. The pressure of the main reservoir fluid in the application valve chamber 30 then shifts the application piston 26 and slide valve 29 to the outward or application position, thereby lapping the passage 101 and cutting off the connection between the feed valve device and the equalizing diaphragm chamber 11 and equalizing reservoirs, and at the same time venting fluid under pressure from the cut-off valve piston chamber 23 to the atmosphere through passage 99, cavity 125 in the application slide valve 29 and the atmospheric passage 110. The brake pipe pressure in chamber 100 acting on the cut-off valve piston 22 then shifts said piston outwardly against the pressure of spring 24, and thereby causes the cut-off valve 20 to be seated against the seat ring 25, so as to cut off further flow of feed valve fluid from the cut-off valve chamber 21 to the brake pipe 15.

In application position of the application slide valve 30, the No. 1 equalizing reservoir and equalizing diaphragm chamber 11 are connected to the first reduction reservoir through pipe and passage 13, cavity 102 in the application slide valve 29 and passage and pipe 124, and since the No. 2 equalizing reservoir is connected to the No. 1 equalizing reservoir through pipe and passage 112, cavity 113 in the hold-back slide valve 51 and passage and pipe 13, the pressure of the fluid in both of the equalizing reservoirs and equalizing diaphragm chamber 11 reduces by equalization into the first reduction reservoir, the rate of such reduction being controlled by the choked portion 130 of passage 124.

The pressure of the fluid in the equalizing diaphragm chamber 11 being thus reduced, the higher pressure of the brake pipe fluid in the equalizing valve chamber 14 deflects the equalizing diaphragm 10 upwardly, which permits the pressure of spring 19 to shift the diaphragm head 18 and slide valve 17 upwardly, so as to connect a port 131 through the slide valve 17 with an atmospheric exhaust passage 138. Fluid under pressure is thereby permitted to flow from the brake pipe 15 to the atmosphere. When the brake pipe pressure is reduced to a degree slightly less than the reduced pressure in the equalizing reservoir acting in the equalizing diaphragm chamber 11, the equalizing diaphragm 10 is deflected downwardly, which shifts the slide valve 17 back to the position shown in the drawing, in which position a further reduction of brake pipe pressure is prevented.

In application position of the application slide valve, fluid at the reduced pressure employed in the operation of the split or two stage reduction valve device is supplied by the feed valve device 4 to the charging valve diaphragm chamber 58 by way of pipe and passage 132, cavity 109 in the application slide valve 29 and passage and pipe 108. The build-up of pressure in chamber 58 deflects the diaphragm 54 upwardly against the pressure of spring 57, which permits the pressure of spring 68 to seat valve 67 and unseat valve 59. With the valve 59 unseated, fluid at feed valve pressure flows from chamber 58 to the No. 1 timing reservoir through the port 65 in the valve 59, chamber 62 and passage and pipe 64. Fluid at the pressure supplied by the feed valve device 4 also flows from passage 108 through a choked passage 133 into passage 115 and thus acts on the exposed areas of the maximum and minimum delay valve pistons 70 and 83 inside of the seat rings 72 and 85, and from passage 115 fluid under pressure is also supplied to a No. 2 timing reservoir, wherein the pressure builds up at a predetermined slow rate.

When the equalizing slide valve 17 of the automatic brake valve device is shifted upwardly to effect a brake pipe reduction, the slide valve uncovers a passage 42 through which fluid at brake pipe pressure flows from the valve chamber 14 to the control piston chamber 41 of the split reduction valve device, and also from chamber 41 through the restricted port 104 in the control piston 40 to the valve chamber 48, which is connected to the atmosphere through passage 105, cavity 106 in the hold-back slide valve 51 and the exhaust passage 107. But the flow capacity of passage and pipe 42 is greater than the flow area of the restricted port 104 in the control piston 40, so that fluid pressure is built up in chamber 41 and on the control piston 40, and piston 40 having a larger area than the control piston 43, the control piston 43 and control slide valve 47 are shifted downwardly to first reduction position against the pressure of the brake pipe fluid in piston chamber 44.

In first reduction position of the control slide valve 47, passage 108 is connected to passage 117 through cavity 118 in said slide valve, and fluid at the pressure supplied by the feed valve device 4 is thereby permitted to flow from passage 108 to the hold back piston chamber 50 by way of passage 117, chamber 78, valve chamber 75 and passage 76. Fluid under pressure also flows from passage 117 to the hold back valve chamber 52 and the charging valve diaphragm chamber 55 by lifting the ball check valve 134 and then flowing through passage 56. Fluid pressure thus builds up in the hold back valve chamber 52 at the same time and to the same degree as the build up of pressure occurs in the hold back piston chamber 50, so that during the first reduction, the pressure of spring 53 holds the hold back piston and slide valve in the inner position, as shown in the drawing.

Since the charging valve diaphragm chamber 58 was charged with fluid at feed valve pressure upon the initiation of the brake application, the build up of fluid at feed valve pressure in the diaphragm chamber 55 at the same time as the hold back valve chamber 52 is charged, permits the spring 57 to deflect the diaphragm 54 downwardly, which seats the valve 59 and thereby prevents further flow of fluid under pressure to the No. 1 timing reservoir through port 65. Seating of valve 59 unseats the valve 67, so that fluid at feed valve pressure supplied to the valve chamber 66, by way of chambers 78 and 88 and through the restricted passage 121 and passage 120, is permitted to flow to the No. 1 timing reservoir by way of chamber 62 and passage and pipe 64 and thereby continue the charging of the No. 1 timing reservoir from the point at which such charging was interrupted through port 65 in the valve 59, the rate of such charging being controlled through the restricted passage 121.

When the brake pipe pressure is reduced a degree substantially equal to the first reduction in pressure of the No. 1 and No. 2 equalizing reservoirs, the equalizing valve mechanism in the automatic brake valve device operates as hereinbefore described to close the brake pipe exhaust passage 138 and at substantially the same time to also lap the passage 42, thereby preventing further flow of brake pipe fluid to the control piston chamber 41. Fluid under pressure from said chamber is then vented to the atmosphere through port 104 in the control piston, valve chamber 48, passage 105, cavity 106 in the hold back slide valve and the atmospheric passage 107. When the pressure of the fluid in the piston chamber 41 is thus reduced to a predetermined degree, the higher pressure of the brake pipe fluid in the control piston chamber 44 shifts the control pistons 43 and 40 and slide valve 47 upwardly to the position shown in the drawing, in which position, passage 108 from the feed valve device 4 is lapped and the hold back piston chamber 50 and the No. 1 timing reservoirs are connected to the atmosphere by way of passage 117 from the chamber 78, cavity 118 in the control slide valve 47 and the restricted passage 119. Since the No. 1 timing reservoir is in free communication with the hold back piston chamber 50 by way of pipe and passage 64, chamber 62, valve chamber 66, passage 120, past the ball check valve 122 and at the same time through the restricted passage 121, and then through chambers 88 and 78, the pressure of the fluid in the No. 1 timing reservoir and hold back piston chamber 50 reduces at a predetermined rate as governed by the restricted passage 119. When the pressure of the fluid in the hold back piston chamber is reduced a predetermined degree, the higher pressure in the hold back valve chamber 52, which is not permitted to reduce while effecting a brake application on account of the ball check valve 134 preventing back flow therefrom, shifts the hold back piston 49 and slide valve 51 downwardly to second reduction position, in which position, cavity 106 in the slide valve connects passage 76 from the hold back piston chamber 50 to the atmospheric passage 107, thereby ensuring that the hold back piston chamber remains vented and therefore that the hold back portion be maintained in second reduction position.

In second reduction position of the hold back slide valve 51, the No. 2 equalizing reservoir is disconnected from the No. 1 equalizing reservoir on account of the hold back slide valve 51 lapping the passages 112 and 13 from said reservoirs, and the first reduction reservoir is connected to the second reduction reservoir through pipe and passage 124, cavity 113 in the hold back slide valve and passage and pipe 127. The fluid under pressure in the first reduction reservoir, the No. 1 equalizing reservoir and in the equalizing diaphragm chamber 11 is thereby permitted to flow to the second reduction reservoir and create a second stage of decrease in the equalizing reservoir pressure acting in the equalizing diaphragm chamber 11. The equalizing valve mechanism then operates in the same manner as hereinbefore described, to effect a second reduction in the pressure of the brake pipe fluid.

When the hold back piston 49 and slide valve 51 move to second reduction position, fluid at brake pipe pressure is supplied from passage 45 to the control valve chamber 48 by way of cavity 135 in the hold back slide valve 51 and passage 105, so that the pressure of the brake pipe fluid supplied to the control piston chamber 41 during the second reduction can not shift the control pistons 40 and 43 and slide valve 47 downwardly to the first reduction position against the frictional resistance of said control pistons and slide valve. This is desirable, since if the control portion 36 were permitted to shift to first reduction position, while effecting the second reduction, it would cause the hold back portion to again operate as during the first reduction and thereby prevent a second reduction from being made.

In order to limit the total degree of brake pipe reduction to that necessary for effecting a full service application of the brakes, the brake valve handle 7 is operated to turn the rotary valve 5 to lap position, so as to lap the passage 127 from the second reduction reservoir. The extent to which the pressure in the No. 1 equalizing reservoir reduces during the second reduction is thereby limited to the degree at which the pressure in said reservoir equalizes into the reduction reservoirs.

It will be noted, that in effecting an automatic brake application in the manner described above, that the rate of reduction in pressure or the rate of flow of fluid under pressure from the No. 1 and No. 2 equalizing reservoirs or from the No. 1 equalizing reservoir only, to the reduction reservoirs is governed by the choked portion 130 of passage 124. Since the No. 1 and No. 2 equalizing reservoirs are connected together during the first reduction, a longer time is therefore required to effect a predetermined reduction in both reservoirs than is required to effect a corresponding reduction in the pressure in the No. 1 equalizing reservoir only, as in the case while the second reduction is being effected. The relation of the two connected equalizing reservoir volumes and the choked portion 130 of passage 124 may be such that the first reduction continues substantially for a period of time required to gather the slack in a train, while the volume of the No. 1 equalizing reservoir only may be such as to cause the second reduction to occur at a faster rate, corresponding substantially to the rate employed in the usual locomotive brake equipment.

According to our invention the brake pipe pressure can not reduce at a rate exceeding the rate of reduction in the pressure of the fluid in the equalizing reservoirs and in the equalizing diaphragm chamber 11. If the rate of brake pipe leakage is greater than the rate at which the equalizing reservoir pressure is reduced, the brake pipe pressure acting in the equalizing valve chamber 14 falls below the equalizing reservoir pressure acting in the equalizing diaphragm chamber 11. The higher pressure in the diaphragm chamber 11 then deflects the diaphragm 10 downwardly, which causes the follower 18 to shift the slide valve 17 downwardly and uncover the passage 136. The passage 136 is also uncovered by the application slide valve 29 in application position, so that fluid at main reservoir pressure then flows from the application valve chamber 30 to the brake pipe 15 through passage 136, the equalizing valve chamber 14 and passage 16. Such flow of fluid maintains the brake pipe pressure at substantially the same degree as the reducing equalizing reservoir pressure.

If the degree of leakage of fluid under pressure from the brake pipe to the atmosphere is sufficient to reduce the brake pipe pressure as fast or faster than the slow predetermined rate of reducing the equalizing reservoir pressure acting in the equalizing diaphragm chamber 11, then in effecting an automatic brake application, the equalizing slide valve 17 is not operated to supply fluid under pressure to the control portion 36 of the split reduction device and cause such portion to operate. In order to cause the second reduction to be initiated within a predetermined time limit under such conditions, the No. 2 timing reservoir becomes charged to a predetermined pressure in a predetermined time in the same manner as hereinbefore described. Such pressure acting on the minimum delay valve piston 83, inside the seat ring 85, shifts said valve piston downwardly against the pressure of spring 86. Fluid under pressure from the No. 2 timing reservoir then flows to the hold back valve chamber 52 through passage 115, valve piston chamber 84, passage 137, past the ball check valve 138 and then through passage 56. The hold back piston chamber 50 being vented to the atmosphere through the restricted exhaust passage 119, controlled by the control slide valve 47, the build-up of pressure in the hold back valve chamber 52 shifts the hold back piston 49 and slide valve 51 downwardly to the second reduction position, in which position a second reduction occurs in the manner hereinbefore described.

When the minimum delay valve piston 83 is shifted downwardly, it operates to seat the double beat valve 87 in the lower position, in which position the charging valve chamber 66 is vented to the atmosphere through passage 120, past the ball check valve 122, through chamber 88, past the fluted stem 90 of valve 87 and from thence to the atmosphere through the exhaust passage 140.

At the same time that fluid under pressure is supplied from the No. 2 timing reservoir through passage 56 to the hold back valve chamber 52 to initiate the second reduction, fluid under pressure from passage 56 flows to the charging valve diaphragm chamber 55. The charging valve diaphragm chamber 58 is charged with fluid at the pressure supplied by the feed valve device 4, when the application slide valve 29 is in application position, so that the fluid pressures become substantially equal on the opposite sides of the charging valve diaphragm 54, thereby permitting the pressure of spring 57 to deflect said diaphragm downwardly, and seat valve 59 and unseat valve 67. Fluid under pressure from the No. 1 timing reservoir then flows to the atmosphere through passage 64, past valve 67 and through the vented chamber 66. If, instead of the fluid from the No. 1 timing reservoir being thus vented to the atmosphere, such fluid were permitted to flow into the chamber 78, it would tend to build up a pressure in the connected hold back piston chamber 50, even though the chamber 78 is connected to the atmosphere through the restricted passage 119 in the control portion, because such restricted passage has less flow area than the passages through which such fluid is supplied to the chamber 78. If a pressure were thus permitted to develop in the hold back piston chamber 50, the fluid under pressure supplied to the hold back valve chamber 52 through operation of the minimum delay valve piston 83, would be prevented from shifting the hold back piston 49 and slide valve 51 downwardly to initiate the second reduction, as above described.

If there are sluggish acting or leaking triple valve devices on the cars in a train, then when effecting an application of the brakes, there is a flow back of fluid under pressure into the brake pipe from the auxiliary reservoirs on the cars. Under such a condition, the amount of fluid under pressure that has to be vented from the brake pipe, by operation of the equalizing valve mechanism in the brake valve device, is increased, so that in order to effect a predetermined brake pipe reduction, the control pistons 40 and 43 and slide valve 47 are held in the downward position for a longer period of time than usual, and since the second reduction is not started until after the control pistons and slide valve move up and the pressure in the No. 1 timing reservoir is reduced, the starting of said second reduction is undesirably delayed. In order to prevent such a delay, the No. 2 timing reservoir and the connected chamber inside of the seat ring 72 of the maximum delay valve piston 70 become charged to such a pressure, in a predetermined maximum time limit, as to cause the maximum delay valve piston 70 to be shifted downwardly against the pressure of spring 73, thereby seating the double beat valve 74 in its lower position, in which position, the hold back piston chamber 50 is vented to the atmosphere through passage 76, chamber 75, past the fluted stem 79 of the double beat valve 74 and through the atmospheric passage 139. Since the hold back valve chamber 52 is charged with fluid under pressure when the control portion is in the first reduction position, such pressure shifts the hold back piston 49 and slide valve 51 downwardly to the second reduction position, thereby causing the second reduction to be initiated.

With the split reduction apparatus, the rate of the first reduction is so slow, in order to avoid shocks on a long train, that when employed with a shorter train, where the brake pipe volume is smaller, the equalizing valve mechanism is not operated to cause any appreciable discharge of fluid under pressure from the brake pipe to the atmosphere. However, in order to ensure that the control portion 36 of the split reduction device will operate to measure the time from the start of the first to the start of the second reduction under such conditions, the passage 42 through which fluid under pressure is supplied to the control piston chamber 41, is so located on the equalizing slide valve seat as to be uncovered by the equalizing slide valve 17 ahead of the brake pipe discharge port 131 registering with the atmospheric exhaust passage 138. Thus, before the brake pipe pressure is permitted to reduce and also upon a small degree of upward movement of the equalizing slide valve 17, the split reduction device is started to operate in order to properly time the start of the second reduction. This is very desirable, since as the train length decreases, less time is required for gathering the slack and as a result the second reduction can be started sooner than with a long train. If the control portion did not operate with a short train to measure the proportionally shorter time to the start of the second reduction, then the start of such reduction would be dependent upon the operation of the minimum delay valve piston 83, which would impose on a short train the minimum delay time required for a long train and would result in an unnecessarily long delay in stopping the short train, as well as would permit the gathered slack in a short train to run out and thereby tend to cause the train stop to be rough.

When charging a train, it is undesirable to have the equalizing reservoir become charged to a pressure higher than the brake pipe pressure, because, if while charging, it is desired to effect a brake application, then the high equalizing reservoir pressure has to be reduced to the same pressure as in the brake pipe before a reduction in brake pipe pressure is effected. This causes an undesired delay in applying the brakes. According to our invention, if in charging, the pressure in the equalizing reservoir and equalizing diaphragm chamber 11 tends to become higher than the brake pipe pressure in the equalizing valve chamber 14, the equalizing diaphragm 10 operates to shift the diaphragm head 18 and slide valve 19 downwardly and uncover passage 136, which passage is connected to the No. 1 equalizing reservoir through cavity 102 in the application slide valve 29 and passage and pipe 13. The higher equalizing reservoir pressure then reduces by flow into the brake pipe through the equalizing valve chamber 14, thereby causing the equalizing reservoir pressure and brake pipe pressure to remain substantially equal.

In manually effecting a brake application by operation of the brake valve device 1 in the well known manner and with the brake application portion in release position as shown in the drawing, the pressure in both the No. 1 and No. 2 equalizing reservoirs is reduced by flow to the atmosphere through pipe and passage 13, cavity 102 in the application slide valve 29, passage 101 and the exhaust port 129, which port is connected with passage 101 in service position of the brake valve device. With the two equalizing reservoirs connected together, the total volume is greater than the volume of the single equalizing reservoir employed with the usual locomotive equipment, but in order that the pressure in the two equalizing reservoirs will reduce at the same rate as occurs with the usual locomotive brake equipment, the flow area through the exhaust port 129 is greater in proportion to the greater volume of the two connected equalizing reservoirs.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. The combination with a brake pipe, of means for effecting a reduction in brake pipe pressure in two stages including two equalizing reservoirs, valve means adapted to initially connect said reservoirs, and means operated upon a reduction in pressure in said reservoirs for effecting the first stage of reduction in brake pipe pressure.

2. The combination with a brake pipe, of means for effecting a reduction in brake pipe pressure in two stages including two equalizing reservoirs, means for venting fluid under pressure from said reservoirs to effect the first stage of reduction in brake pipe pressure and for venting fluid under pressure from only one of said reservoirs to effect the second stage of reduction in brake pipe pressure, valve means adapted to initially connect said reservoirs together, and means for effecting the operation of said valve means to disconnect said reservoirs.

3. The combination with a brake pipe, of means for effecting a reduction in brake pipe pressure in two stages including two equalizing reservoirs, valve means for normally connecting said reservoirs, means for charging one of said reservoirs with fluid under pressure and also the other reservoir by reason of the connection of one reservoir to the other, and means operated upon a reduction in pressure in said reservoirs for effecting the first stage of reduction in brake pipe pressure.

4. The combination with a brake pipe, of an equalizing reservoir, a movable abutment subject to the opposing pressures of the brake pipe and said reservoir, and valve means operated by said abutment upon a reduction in pressure in the equalizing reservoir for venting fluid from the brake pipe and upon a reduction in pressure in the brake pipe below that in the equalizing reservoir for supplying fluid under pressure to the brake pipe.

5. The combination with a brake pipe, of an equalizing reservoir, a movable abutment subject to the opposing pressures of the brake pipe and said reservoir, and valve means operated by said abutment upon a reduction in pressure in the equalizing reservoir for venting fluid from the brake pipe and upon the pressure in the brake pipe reducing at a greater rate than the pressure reduces in the equalizing reservoir for supplying fluid under pressure to the brake pipe.

6. The combination with a brake pipe, of means for effecting a reduction in brake pipe pressure in two stages including an equalizing reservoir, a fluid pressure operated control valve device, a movable abutment subject to the opposing pressures of the equalizing reservoir and the brake pipe and valve means operated by said abutment for venting fluid from the brake pipe and for separately varying the fluid pressure on said control valve device.

7. The combination with a brake pipe, of means for effecting a reduction in brake pipe pressure in two stages including an equalizing reservoir, a fluid pressure operated control valve device, a movable abutment subject to the opposing pressures of the equalizing reservoir and the brake pipe, and valve means operated by said abutment for venting fluid from the brake pipe and for separately supplying fluid under pressure to said control valve device.

8. The combination with a brake pipe, of means for effecting a reduction in brake pipe pressure in two stages including an equalizing reservoir, a fluid pressure operated control valve device, a movable abutment subject to the opposing pressures of the equalizing reservoir and the brake pipe, and valve means operated by said abutment for venting fluid from the brake pipe, for varying the fluid pressure on said control valve device, and for supplying fluid under pressure to the brake pipe.

9. The combination with a brake pipe, of means for effecting a reduction in brake pipe pressure in two stages including an equalizing reservoir, a movable abutment subject to the opposing pressures of the brake pipe and the equalizing reservoir, and a slide valve operated by said abutment for venting fluid from the brake pipe in one position and for supplying fluid under pressure to the brake pipe in another position.

10. The combination with a brake pipe, of means for effecting a reduction in brake pipe pressure in two stages including an equalizing reservoir, a fluid pressure operated control valve device, a movable abutment subject to the opposing pressures of the brake pipe and the equalizing reservoir, and a valve operated by said abutment for first varying the fluid pressure on said control valve device and for then venting fluid from the brake pipe.

11. The combination with a brake pipe, of means for effecting a reduction in brake pipe pressure in two stages including an equalizing reservoir, a fluid pressure operated control valve device, a movable abutment subject to the opposing pressures of the brake pipe and the equalizing reservoir, and a valve movable by said abutment for first supplying fluid under pressure to said control valve device and for then venting fluid from the brake pipe.

12. The combination with a brake pipe, of means for effecting a reduction in brake pipe pressure in two stages including a valve device for initiating the second stage of reduction in brake pipe pressure, means operated after the first stage of reduction in brake pipe pressure ceases for effecting the operation of said valve device, valve means operated a predetermined time after the first stage of reduction is initiated for effecting the operation of said valve device, and valve means operated a greater predetermined time after the first stage of reduction is initiated for effecting the operation of said valve device.

13. The combination with a brake pipe, of means for effecting a reduction in brake pipe pressure in two stages including a valve device for initiating the second stage of reduction in brake pipe pressure, a timing reservoir, valve means operated upon a predetermined change in pressure in said reservoir for effecting the operation of said valve device, and valve means operated upon a greater predetermined change in pressure in said reservoir for also effecting the operation of said valve device.

14. The combination with a brake pipe, of means for effecting a reduction in brake pipe pressure in two stages including a valve device for initiating the second stage of reduction in brake pipe pressure, a timing reservoir, valve means operated upon a predetermined increase in pressure in said reservoir for effecting the operation of said valve device, and valve means operated upon a greater predetermined increase in pressure in said reservoir for also effecting the operation of said valve device.

15. The combination with a brake pipe, of means for effecting a reduction in brake pipe pressure in two stages including a valve device for initiating the second stage of reduction in brake pipe pressure, a timing reservoir, means for charging said reservoir with fluid under pressure at a predetermined rate, means operated after the first reduction in brake pipe pressure ceases for effecting the operation of said valve device upon a predetermined reduction in pressure in said timing reservoir, a second timing reservoir, means for charging said second reservoir with fluid under pressure at a predetermined rate, and valve means operated upon a predetermined increase in pressure in said second reservoir for effecting the operation of said valve device.

16. The combination with a brake pipe, of means for effecting a reduction in brake pipe pressure in two stages including a valve device for initiating the second stage of reduction in brake pipe pressure, a timing reservoir, means for charging said reservoir with fluid under pressure at a predetermined rate, means operated after the first reduction in brake pipe pressure ceases for effecting the operation of said valve device upon a predetermined reduction in pressure in said timing reservoir, a second timing reservoir, means for charging said second reservoir with fluid under pressure at a predetermined rate, valve means operated upon a predetermined increase in pressure in said second reservoir for effecting the operation of said valve device, and valve means operated upon a greater predetermined increase in pressure in said second reservoir for effecting the operation of said valve device.

In testimony whereof we have hereunto set our hands this 16th day of November, 1927.

THOMAS H. THOMAS.
CLAUDE A. NELSON.